United States Patent
Jang

(10) Patent No.: US 10,433,361 B2
(45) Date of Patent: Oct. 1, 2019

(54) RADIO FREQUENCY SETTING SYSTEM AND MOBILE TERMINAL

(71) Applicant: Samsung Electronics Co., Ltd., Suwon-si, Gyeonggi-do (KR)

(72) Inventor: Won Churl Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/052,000

(22) Filed: Aug. 1, 2018

(65) Prior Publication Data

US 2019/0191477 A1 Jun. 20, 2019

(30) Foreign Application Priority Data

Dec. 19, 2017 (KR) .................. 10-2017-0175079

(51) Int. Cl.
| H04B 5/00 | (2006.01) |
| H04W 76/18 | (2018.01) |
| H04W 76/14 | (2018.01) |

(52) U.S. Cl.
CPC ........... *H04W 76/18* (2018.02); *H04W 76/14* (2018.02)

(58) Field of Classification Search
CPC ................................. H04B 5/00; H04W 28/18
See application file for complete search history.

(56) References Cited

U.S. PATENT DOCUMENTS

| 8,314,702 | B2 * | 11/2012 | Garrett | ...................... H04B 5/00 340/10.1 |
| 8,618,697 | B2 | 12/2013 | Karaoguz et al. | |
| 8,838,026 | B2 | 9/2014 | Hillan et al. | |
| 8,989,658 | B2 | 3/2015 | Hillan et al. | |
| 9,042,819 | B2 | 5/2015 | Dua | |
| 9,112,541 | B2 | 8/2015 | Hillan et al. | |
| 9,351,144 | B2 | 5/2016 | Hillan et al. | |
| 9,497,576 | B2 | 11/2016 | Jin et al. | |
| 2007/0004344 | A1 * | 1/2007 | DeGroot | .............. H04B 1/0458 455/78 |
| 2008/0117847 | A1 * | 5/2008 | Hamada | ................ H04W 28/18 370/310 |

(Continued)

FOREIGN PATENT DOCUMENTS

| KR | 101540332 B1 | 7/2015 |
| KR | 101672364 B1 | 11/2016 |
| KR | 101688356 B1 | 12/2016 |

*Primary Examiner* — Cindy Trandai
(74) *Attorney, Agent, or Firm* — Myers Bigel, P.A.

(57) ABSTRACT

A radio frequency (RF) setting system includes an RF recognition reader configured to recognize an external near field communication (NFC) reader, an RF update controller configured to acquire a default setting value from among a plurality of setting values stored in a memory in response to the recognition of the external NFC reader, and an RF setting value specification module configured to set the default setting value as an RF setting value. When a connection for NFC is not established to the external NFC reader within a predetermined amount of time, the RF recognition reader is further configured to recognize that the connection for NFC fails, and the RF update controller is further configured to sequentially update the RF setting value with each of the plurality of setting values excluding the default setting value until the connection for NFC is successfully established to the external NFC reader.

20 Claims, 8 Drawing Sheets

(56) References Cited

U.S. PATENT DOCUMENTS

| | | | |
|---|---|---|---|
| 2008/0180246 A1* | 7/2008 | Malik | G06K 7/0008 |
| | | | 340/572.1 |
| 2011/0230235 A1* | 9/2011 | Jan | H04M 1/72569 |
| | | | 455/557 |
| 2012/0045989 A1 | 2/2012 | Suumaeki et al. | |
| 2014/0085058 A1* | 3/2014 | Horst | G06K 7/10356 |
| | | | 340/10.51 |
| 2014/0171103 A1* | 6/2014 | Murphy | H04W 4/021 |
| | | | 455/456.1 |
| 2014/0171104 A1* | 6/2014 | Murphy | H04W 64/00 |
| | | | 455/456.1 |
| 2015/0133047 A1 | 5/2015 | Smith et al. | |
| 2015/0155916 A1* | 6/2015 | Kuo | G06F 3/041 |
| | | | 455/41.1 |
| 2016/0174267 A1* | 6/2016 | Mofidi | H04B 5/02 |
| | | | 455/41.1 |
| 2018/0027409 A1* | 1/2018 | Khanna | H04W 4/50 |
| | | | 455/41.2 |

\* cited by examiner

FIG. 6

| Index | RF setting value | Location Information |
|---|---|---|
| 1 | setting value 1 | Location 1 |
| 2 | setting value 2 | Location 2, Location 3 |
| 3 | setting value 3 | - |
| ⋮ | ⋮ | ⋮ |
| M | setting value M | Location 5 |

RADIO FREQUENCY SETTING SYSTEM AND MOBILE TERMINAL

CROSS-REFERENCE TO RELATED APPLICATION

This non-provisional application claims priority under 35 U.S.C. § 119 to Korean Patent Application No. 10-2017-0175079, filed on Dec. 19, 2017 in the Korean Intellectual Property Office, the disclosure of which is incorporated herein in its entirety by reference.

BACKGROUND

The present disclosure relates to a radio frequency (RF) setting system and a mobile terminal. Terminals may be generally classified as mobile/portable terminals or stationary terminals, according to their mobility. Mobile terminals may also be classified as handheld terminals or vehicle mounted terminals, according to whether or not users can directly carry them.

The functionality of mobile terminals has diversified. Mobile terminals may perform various functions such as electronic payment using near field communication (NFC).

Non-standard NFC readers having radio frequency (RF) setting values that do not meet conventional standards are widely spread. However, a connection for NFC may not be properly established between a mobile terminal and a non-standard NFC reader. Thus, a method is needed to establish a connection for NFC between a mobile terminal and a non-standard NFC reader.

SUMMARY

Embodiments of the present disclosure provide a method of establishing a connection for near field communication (NFC) between a mobile terminal and a non-standard NFC reader having a radio frequency (RF) setting value that does not meet conventional standards.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to some embodiments of the present disclosure, a radio frequency (RF) setting system includes an RF recognition reader configured to recognize an external near field communication (NFC) reader, an RF update controller configured to acquire a default setting value from among a plurality of setting values stored in a memory in response to the recognition of the external NFC reader by the RF recognition reader, and an RF setting value specification module configured to set the default setting value as an RF setting value. When a connection for NFC is not established to the external NFC reader within a predetermined amount of time, the RF recognition reader is further configured to recognize that the connection for NFC fails, and the RF update controller is further configured to sequentially update the RF setting value with ones of the plurality of setting values excluding the default setting value until the connection for NFC is successfully established to the external NFC reader.

According to some embodiments of the present disclosure, an RF setting system includes an RF recognition reader configured to recognizing recognize an external NFC reader; an RF update controller configured to acquire a default setting value from among a plurality of setting values stored in a memory, in response to the recognition of the external NFC reader, an RF setting value specification module configured to set the default setting value as an RF setting value, and a location information verification module configured to receive current location information and configured to acquire a first setting value corresponding to the current location information from the memory. When the first setting value corresponding to the current location information is acquired from among the plurality of setting values by the location information verification module, the RF update controller is further configured to set the first setting value that was acquired, instead of the default setting value, as the RF setting value.

According to some embodiments of the present disclosure, a mobile terminal includes a communication chip configured to establish a connection for communication with an external server, a location information recognition chip configured to recognize first information, that is information regarding a current location of the mobile terminal, a memory configured to store a plurality of setting values, an RF recognition reader configured to recognize an external NFC reader, an RF update controller configured to acquire a default setting value from among the plurality of setting values in response to the recognition of the external NFC reader, and an RF setting value specification module configured to set the default setting value as an RF setting value. When a connection for NFC is not established to the external NFC reader within a predetermined amount of time, the RF recognition reader is further configured to recognize that the connection for NFC fails. The RF update controller is further configured to sequentially update the RF setting value with ones of the plurality of setting values until the connection for NFC is successfully established to the external NFC reader. When the RF recognition reader recognizes that the connection for NFC has failed in a state where a first setting value having a predetermined index value is set as the RF setting value, the RF update controller is further configured to transmit the first information and a second information, which is information regarding the external NFC reader, to the external server.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which:

FIG. 6 is a table showing RF setting values stored in a memory in accordance with example embodiments of the present disclosure.

DETAILED DESCRIPTION

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below.

The present disclosure relates to a radio frequency (RF) setting system and a mobile terminal. The present disclosure proposes setting a basic RF setting value and a non-standard RF setting value in an NFC smartphone and automatically changing the RF setting value according to the current position information of the smartphone. The NFC reader may be recognized by changing the setting function on the NFC reader, upon failure to be recognized. As described herein, the NFC reader recognition performance may be improved with additional convenience for the user. The RF automatic setting technique may include changing the NFC RF configuration automatically using smartphone location information. The NFC RF configuration may be reset or adjusted when NFC RF recognition fails. The server may be notified when NFC RF recognition fails, even when the NFC RF configuration is reset.

Figure 1:
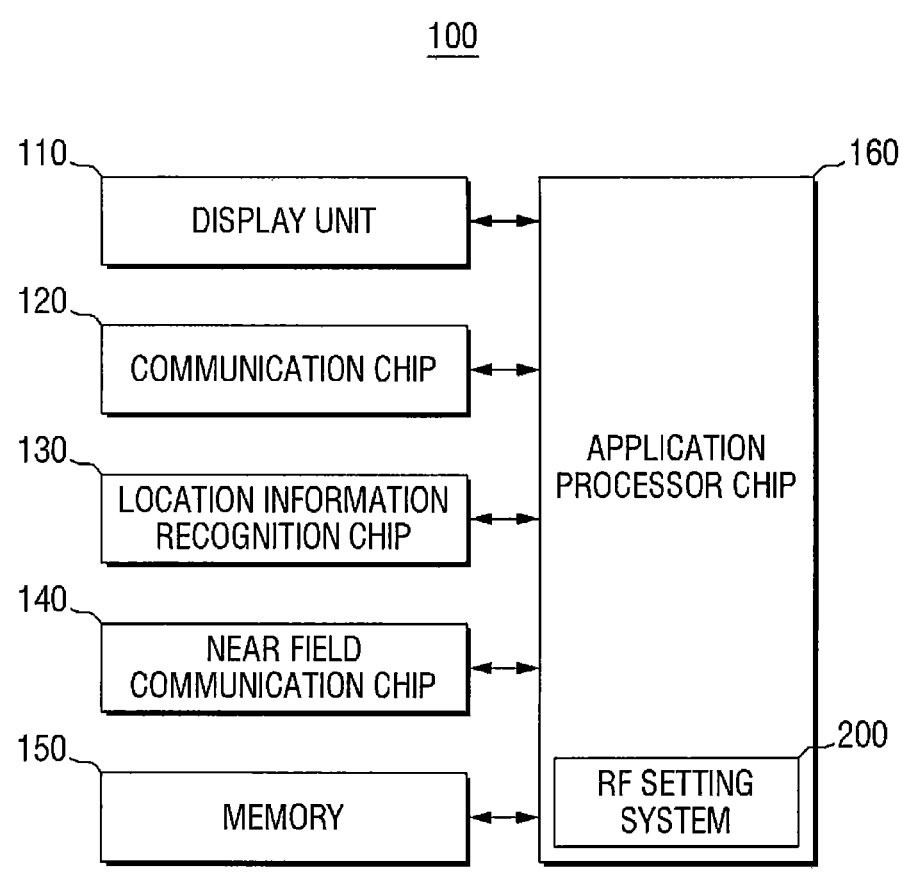
FIG. 1 is a block diagram of a mobile terminal having a radio frequency (RF) setting system according to example embodiments of the present disclosure.

FIG. 1 is a block diagram of a mobile terminal having a radio frequency (RF) setting system according to some embodiments of the present disclosure.

Referring to FIG. 1, a mobile terminal 100 may include a display unit 110, a communication chip 120, a location information recognition chip 130, a near field communication (NFC) chip 140, a memory 150, and an application processor chip 160. The elements illustrated in FIG. 1, however, are not all necessarily essential for realizing the mobile terminal 100, and the mobile terminal 100 may include more or fewer elements than those illustrated in FIG. 1.

The mobile terminal 100 may be implemented as a smart phone, an enterprise digital assistant (EDA), a digital still camera, a digital video camera, a portable multimedia player (PMP), a personal/portable navigation device (PND), a mobile Internet device (MID), a wearable computer, an Internet of things (IOT) device, an Internet of everything (IOE) device, or an electronic book (e-book), but the present disclosure is not limited thereto. The mobile terminal 100 may also be implemented as a television (TV), a digital TV (DTV), an Internet protocol TV (IPTV), a personal computer (PC), a desktop computer, a laptop computer, a computer workstation, a tablet PC, and/or a video game platform (or console). As used herein, the term "and/or" includes any and all combinations of one or more of the associated listed items. Expressions such as "at least one of," when preceding a list of elements, modify the entire list of elements and do not modify the individual elements of the list.

The display unit 110 may output information processed by the mobile terminal 100. For example, the display unit 110 may display execution screen information of an application program executed in the mobile terminal 100 or display user interface (UI) or graphic user interface (GUI) information corresponding to the execution screen information.

The display unit 110 may include at least one of a liquid crystal display (LCD), a thin film transistor-liquid crystal display (TFT-LCD), an organic light-emitting diode (OLED), a flexible display, a three-dimensional (3D) display, and an electronic-ink (e-ink) display.

Two or more display units 110 may be provided depending on the type of the mobile terminal 100. In this case, the two or more display units 110 may be disposed on the same side of the mobile terminal 100 to be either spaced apart from each other or grouped together, or may be disposed on different sides of the mobile terminal 100.

The communication chip 120 may include one or more modules, which establish communication between the mobile terminal 100 and an RF communication system, between the mobile terminal 100 and another mobile terminal, or between the mobile terminal 100 and an external server. The communication chip 120 may also include one or more modules, which connect the mobile terminal 100 to one or more networks.

The communication chip 120 may transmit wireless signals to, or receive wireless signals from, at least one of a base station, an external terminal, and a server over a mobile communication network established in accordance with a mobile communication standard or scheme such as, for example, Global System for Mobile communication (GSM), Code Division Multi-Access (CDMA), Code Division Multi-Access2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and/or Long Term Evolution-Advanced (LTE-A).

The wireless signals may include various types of data depending on whether they are for the transmission/reception of voice call signals, video call signals, text/multimedia messages, or the like.

Also, the communication chip 120 may be embedded in, or externally attached to, the mobile terminal 100 for wireless Internet access. The communication chip 120 may be configured to transmit wireless signals to, or receive wireless signals from, a communication network in accordance with a wireless Internet scheme.

The wireless Internet scheme may include, for example, Wireless Local Area Network (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and/or Long Term Evolution-Advanced (LTE-A), and the communication chip 120 may transmit or receive data in accordance with at least one selected from a range of wireless Internet schemes not only including those set forth herein, but also encompassing various other wireless Internet schemes.

The location information recognition chip 130 is a chip for acquiring location information of the mobile terminal 100 (or current location information), and may include, for example, a Global Positioning System (GPS) chip or a Wi-Fi chip.

In one example, in a case where the mobile terminal 100 uses a GPS chip, the location information of the mobile terminal 100 may be acquired using signals transmitted by a GPS satellite.

In another example, in a case where the mobile terminal 100 uses a Wi-Fi chip, the location information of the mobile terminal 100 may be acquired based on information of a wireless access point (AP) that transmits wireless signals to, or receives wireless signals from, the Wi-Fi chip.

The location information recognition chip 130, which is a chip for acquiring the location information of the mobile terminal 100 (or the current location information), is not particularly limited to a chip that directly calculates or acquires the location information of the mobile terminal 100.

The NFC chip 140, which is a chip for NFC, may support NFC. The NFC chip 140 may support wireless communication between the mobile terminal 100 and a wireless communication system and between the mobile terminal 100 and another mobile terminal (for example, an NFC reader) using a WLAN.

In some embodiments, the NFC chip 140 may be included in or operate in conjunction with the communication chip 120.

The memory 150 may store data for supporting various functions of the mobile terminal 100. The memory 150 may store application programs (or applications) executed in the mobile terminal 100 and/or data and/or instructions for operating the mobile terminal 100. At least some of the application programs may be downloaded from an external server via wireless communication. At least some of the application programs may be installed in the mobile terminal 100 at the time of manufacturing or shipping, which is typically the case for the basic functions of the mobile terminal 100 (for example, the functions of receiving calls, placing calls, receiving messages, sending messages, and the like). The application programs may be stored in the memory 150, may be installed in the mobile terminal 100, and may be executed by the application processor chip 160 to perform an operation (or function) of the mobile terminal 100.

The application processor chip 160 may be configured to control overall operations of the mobile terminal 100. The application processor chip 160 may perform various operations executed in the mobile terminal 100 and/or may process data. The application processor chip 160 may drive an operating system (OS), an application, and/or a database manager for operating the mobile terminal 100.

The application processor chip 160 may include an RF setting system 200. The RF setting system 200 may be implemented as hardware and/or as software or a combination thereof. The RF setting system 200 will hereinafter be described with reference to FIG. 2.

Figure 2:
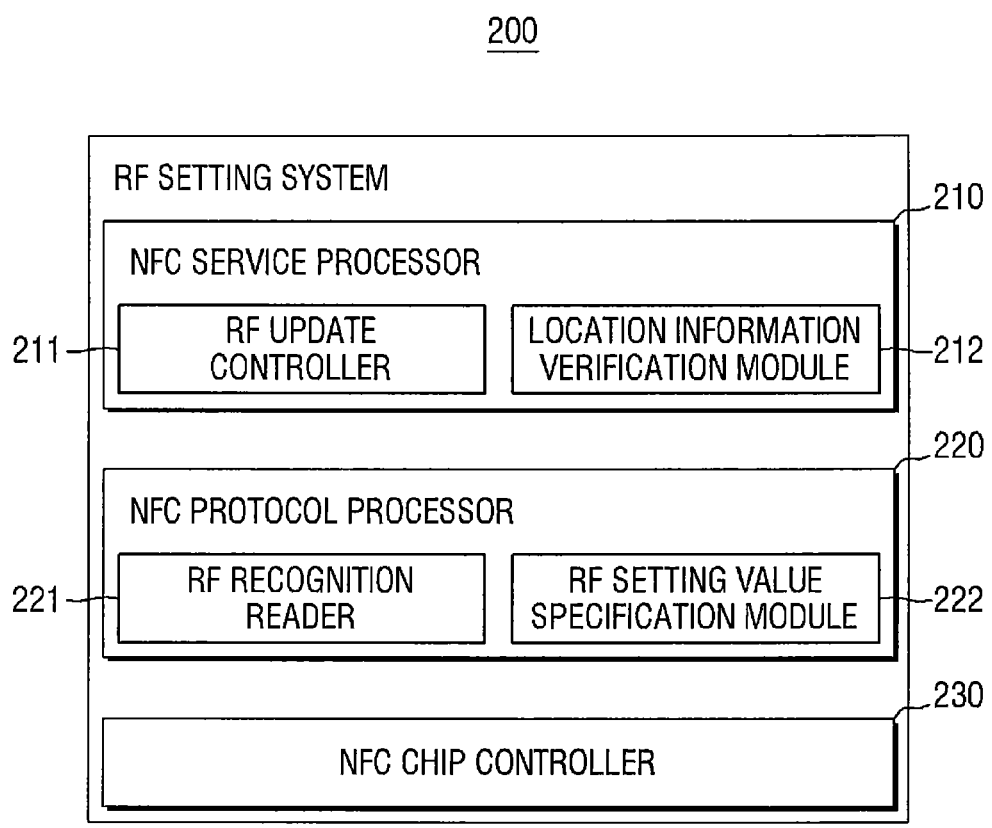
FIG. 2 is a block diagram of an RF setting system according to example embodiments of the present disclosure.

FIG. 2 is a block diagram of an RF setting system according to some embodiments of the present disclosure.

Referring to FIG. 2, an RF setting system 200 may include an NFC service processor 210, an NFC protocol processor 220, and an NFC controller 230. The elements illustrated in FIG. 2, however, are not all necessarily essential for realizing the RF setting system 200, and the RF setting system 200 may include more or fewer elements than those illustrated in FIG. 2.

The NFC service processor 210 may update an RF setting value. The NFC service processor 210 may include an RF update controller 211 and a location information verification module 212.

The location information verification module 212 may receive current location information from the location information recognition chip 130 periodically (for example, every five seconds). The location information verification module 212 may search for a setting value corresponding to the current location information from the memory 150. The memory 150 may store location information of a non-standard NFC reader and information regarding a setting value of the non-standard NFC reader. The non-standard NFC reader may refer to an NFC reader using an RF setting value that does not meet a given standard.

In some embodiments, the RF update controller 211 may receive a setting value from the location information verification module 212. The RF update controller 211 may send a request to the NFC protocol processor 220 to update an RF setting value based on the received setting value.

In some other embodiments, if communication with an NFC reader at a particular location fails with a default setting value set as an RF setting value, the RF update controller 211 may reattempt NFC by updating the RF setting value. Then, if a connection for NFC is successfully established using the updated RF setting value, the RF update controller 211 may store the updated RF setting value in the memory 150 by mapping it with location information of the NFC reader.

The NFC protocol processor 220 may transmit an RF setting value to the NFC chip controller 230 or may determine whether a connection for NFC has been successfully established.

The NFC protocol processor 220 may include an RF recognition reader 221 and an RF setting value specification module 222.

The RF setting value specification module 222 may transmit the RF setting value updated in accordance with a request from the RF update controller 211 to the NFC chip controller 230.

The RF recognition reader 221 may determine whether NFC has been successfully established and may transmit the result of the determination to the RF update controller 211. Also, the RF recognition reader 221 may recognize an external NFC reader.

The NFC chip controller 230 may control an NFC chip using a setting value transmitted by the RF setting value specification module 222.

Figure 3:
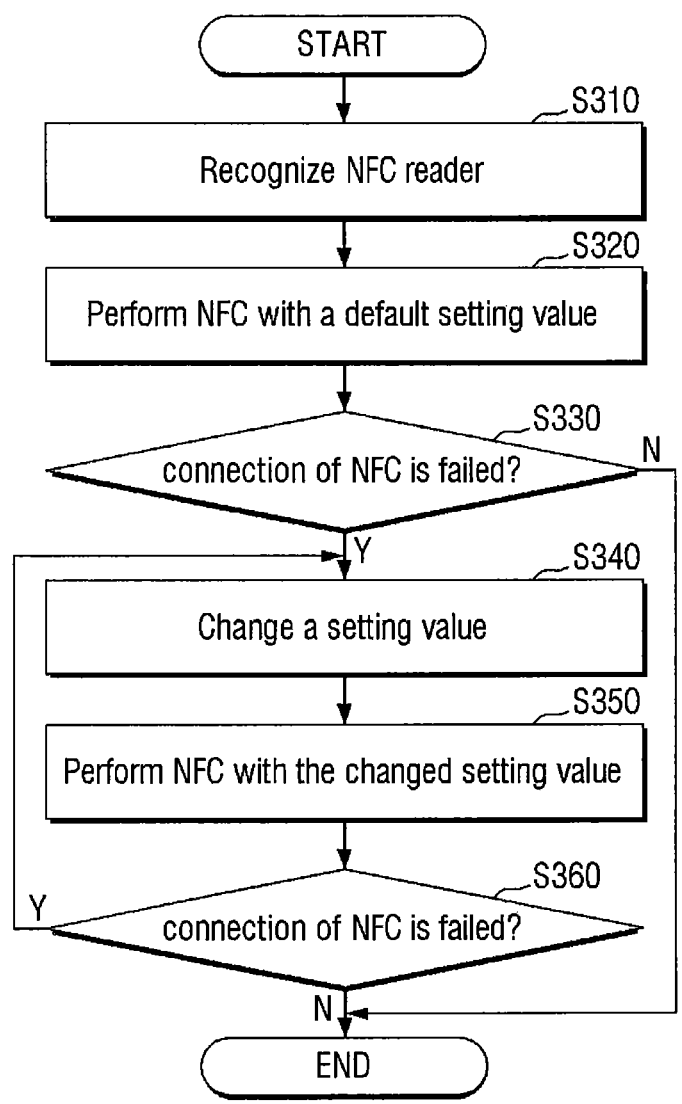
FIG. 3 is a flowchart illustrating a method of establishing a connection for NFC using an RF setting system according to example embodiments of the present disclosure.

FIG. 3 is a flowchart illustrating a method of establishing a connection for NFC using an RF setting system according to some embodiments of the present disclosure.

Referring to FIG. 3, an RF recognition reader 221 of FIG. 2 may recognize an external NFC reader (S310).

For example, the RF recognition reader 221 of FIG. 2 may recognize that the external NFC reader is located nearby if a signal emitted from the external NFC reader is detected by the RF recognition reader 221 of FIG. 2.

Once the external NFC reader is detected, an RF update controller 211 of FIG. 2 may acquire a default setting value from a memory.

The RF update controller 211 of FIG. 2 may transmit the default setting value to an RF setting value specification module 222. The RF setting value specification module 222 may set an RF setting value using the default setting value. An NFC chip controller 230 of FIG. 2 may perform NFC with the set RF setting value by controlling an NFC chip (S320).

Thereafter, the RF recognition reader 221 of FIG. 2 may determine whether a connection for NFC has failed (S330).

If a determination is made that a connection for NFC has been established to the external NFC reader within a predefined amount of time (S330, N), the RF recognition reader 221 of FIG. 2 may perform a function such as electronic payment with the external NFC reader.

On the other hand, if a determination is made that a connection for NFC has not been established to the external NFC reader within the predefined amount of time, the RF recognition reader 221 of FIG. 2 may recognize that a connection for NFC has failed.

If the RF recognition reader 221 recognizes that a connection for NFC has failed (S330, Y), the RF update controller 211 may update the RF setting value (S340).

For example, the memory 150 may store a plurality of setting values. Each of the plurality of setting values may have an index value. The RF update controller 211 may update the RF setting value with a setting value corresponding to an index value of 1, for example various index values may be used of subsequent iterations.

The RF setting value specification module 222 may set the updated RF setting value as a new RF setting value. The NFC chip controller 230 may perform NFC, with the RF setting value updated in S340, by controlling the NFC chip (S350).

Thereafter, the RF recognition reader 221 of FIG. 2 may determine whether a connection for NFC has failed (S360).

If a determination is made that a connection for NFC has not been established to the external NFC reader within the predefined amount of time, the RF recognition reader 221 of FIG. 2 may recognize that a connection for NFC has failed (S360, Y).

Then, the method returns to S340 so that the RF setting value may be updated again.

The RF update controller 211 of FIG. 2 may continue to sequentially update the RF setting value with each of the plurality of setting values stored in the memory 150 of FIG. 1 until a connection for NFC is successfully established to the external NFC reader.

For example, the RF update controller 211 of FIG. 2 may update the RF setting value with a setting value corresponding to an index value of 2 from among the plurality of setting values stored in the memory 150 of FIG. 1.

In some embodiments, the RF update controller 211 of FIG. 2 may prevent the RF setting value from being updated any longer once the RF setting value is updated with a first setting value corresponding to a predetermined index value. The predetermined index value may be an index value to which the last one of the plurality of setting values stored in the memory 150 is mapped. It will be understood that, although the terms first, second, third, etc. may be used herein to describe various elements, elements should not be limited by these terms; rather, these terms are only used to distinguish one element from another element. Thus, a first element discussed below could be termed a second element without departing from the scope of the present inventive concepts.

According to the embodiment of FIG. 3, if a connection for NFC fails, a mobile terminal 100 may establish a connection for NFC by automatically changing an RF setting value.

Figure 4:
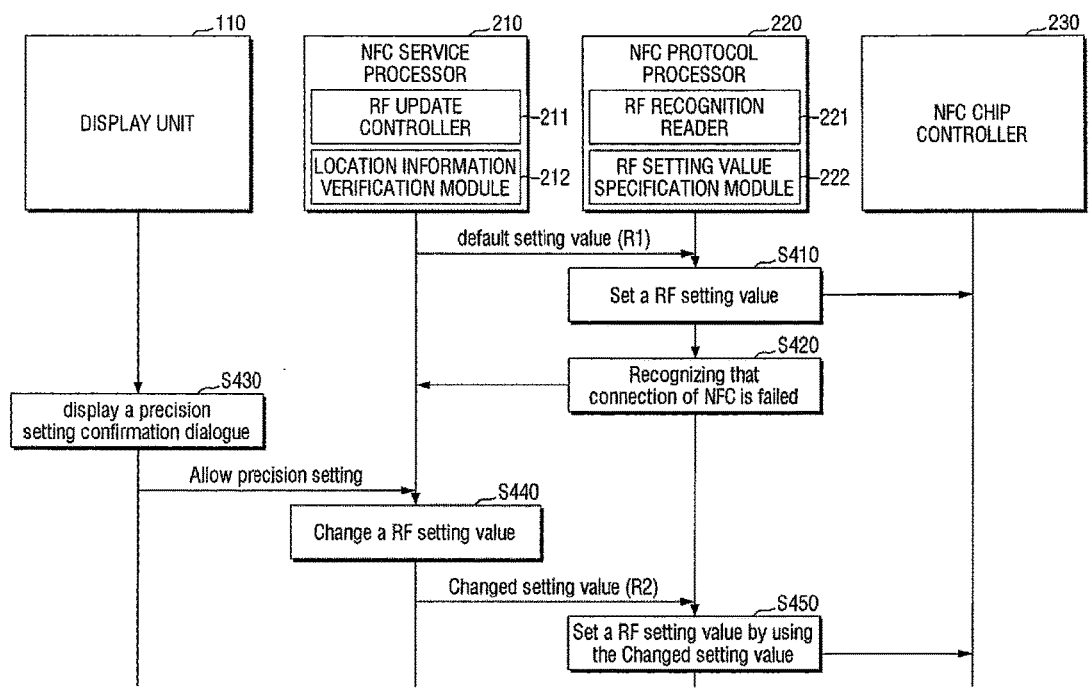
FIG. 4 is a flowchart illustrating a method of establishing a connection for NFC using an RF setting system according to example embodiments of the present disclosure.

FIG. 4 is a flowchart illustrating a method of establishing a connection for NFC using an RF setting system, according to some embodiments of the present disclosure.

Referring to FIG. 4, if a user activates an NFC function of the mobile terminal 100 of FIG. 1, the RF update controller 211, which is included in the NFC service processor 210, may acquire a default setting value R1 from among a plurality of RF setting values stored in the memory 150. The RF update controller 211 may transmit the default setting value R1 to the NFC protocol processor 220.

The RF setting value specification module 222, which is included in the NFC protocol processor 220, may set the default setting value R1 as an RF setting value (S410).

Specifically, the RF setting value specification module 222 may transmit the default setting value R1 to the NFC chip controller 230 (S410). The NFC chip controller 230 may set the default setting value R1 as the RF setting value.

The RF recognition reader 221 may determine whether a connection for NFC has been established to an NFC reader within a predetermined amount of time.

If a determination is made that a connection for NFC has not been established to the NFC reader within the predetermined amount of time, the RF recognition reader 221 may recognize that a connection for NFC with the NFC reader has failed (S420). In this case, the NFC protocol processor 220 may transmit a signal indicating that a connection for NFC with the NFC reader has failed to the NFC service processor 210.

The display unit 110, which is included in the mobile terminal 100, may display a precision setting confirmation dialogue (S430).

The mobile terminal 100 may receive an execution command for precision setting through the precision setting confirmation dialogue. For example, if the user manipulates a User Interface (UI) to instruct that a precision setting mode be executed, the mobile terminal 100 may recognize that an execution command for RF precision setting has been received.

If the mobile terminal 100 recognizes that an execution command for precision setting has been received, the RF service processor 210 may update the RF setting value via the RF update controller 211 (S440).

For example, the RF update controller 211 may update the RF setting value with a setting value R2 corresponding to a first index value from among the plurality of setting values stored in the memory 150. Then, the RF update controller 211 may transmit the setting value R2 to the NFC protocol processor 220.

The RF setting value specification module 222 may update the RF setting value with the setting value R2 transmitted by the RF update controller 211 (S450).

Specifically, the RF setting value specification module 222 may transmit the setting value R2 to the NFC chip controller 230. The NFC chip controller 230 may update the RF setting value with the setting value R2.

Figure 5:
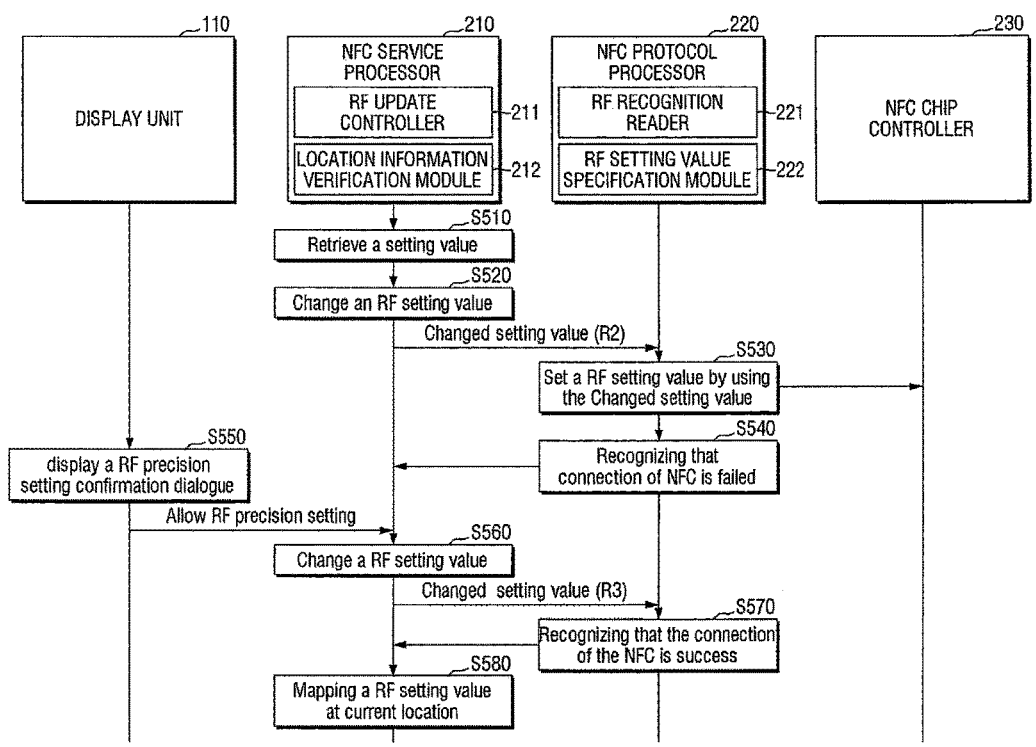
FIG. 5 is a flowchart illustrating a method of establishing a connection for NFC using an RF setting system according to example embodiments of the present disclosure.

FIG. 5 is a flowchart illustrating a method of establishing a connection for NFC using an RF setting system according to some embodiments of the present disclosure. FIG. 6 is a table showing RF setting values stored in a memory in accordance with some embodiments of the present disclosure.

Referring to FIG. 5, the location information verification module 212 may search a setting value corresponding to the current location of the mobile terminal 100 from the memory 150 of FIG. 1, particularly, from among a plurality of setting values stored in the memory 150 (S510).

In some embodiments, if the user activates the NFC function of the mobile terminal 100, the location information verification module 212 may search for the setting value corresponding to the current location of the mobile terminal 100 from the memory 150.

In some other embodiments, an attempt may be made to establish a connection for NFC in a state where a default setting value is set as the RF setting value, and the location information verification module 212 may search for the setting value corresponding to the current location of the mobile terminal 100 from the memory 150, only if the attempt fails.

Referring to FIG. 6, a plurality of setting values may be stored in the memory 150 of FIG. 1. Each of the plurality of setting values may have an index value. Each of the plurality of setting values may also have location information mapped thereto. The location information may be location information of each NFC reader having a non-standard setting value.

In one example, a first setting value corresponding to an index value of 1 may be stored in the memory 150 by being mapped with a first location.

In another example, a second setting value corresponding to an index value of 2 may be stored in the memory 150 by being mapped with second and third locations. In other words, a setting value may be associated with one or more locations.

In yet another example, a third setting value corresponding to an index value of 3 may be stored in the memory 150 without being mapped with any location information. In other words, if an index value is not mapped to any locations, that particular index value may not be of use in establishing NFC communication.

If the current location of the mobile terminal 100 is the first location, the location information verification module 212 may acquire the first setting value, which has the index value of 1, from among the plurality of setting values stored in the memory 150 as a setting value corresponding to the current location of the mobile terminal 100.

Referring again to FIG. 5, once the setting value corresponding to the current location of the mobile terminal 100 is acquired by the location information verification module 212, the RF update controller 211 may update an RF setting value with the acquired setting value (S520). Then, the RF update controller 211 may transmit the updated setting value, i.e., a setting value R2, to the RF setting value specification module 222.

The RF setting value specification module 222 may set the updated setting value as the RF setting value (S530). The NFC chip controller 230 may receive the RF setting value from the RF setting value specification module 222 and may establish a connection for NFC.

The RF recognition reader 221 may determine whether a connection for NFC has failed. If the RF recognition reader 221 recognizes that a connection for NFC has failed (S540), the RF recognition reader 221 may transmit a signal or message indicating that a connection for NFC has failed to the RF update controller 211.

The display unit 110, which is included in the mobile terminal 100, may display a precision setting confirmation dialogue (S550).

The mobile terminal 100 may receive an execution command for precision setting through the precision setting confirmation dialog. For example, if the user manipulates a UI to instruct that a precision setting mode be executed, the mobile terminal 100 may recognize that an execution command or message for RF precision setting has been received.

If the mobile terminal 100 recognizes that an execution command or message for precision setting has been received, the RF setting value may be updated via the RF update controller 211 (S560).

For example, the RF update controller 211 may update the RF setting value with a setting value R3 having a second index value from among the plurality of setting values stored in the memory 150. Then, the RF update controller 211 may transmit the setting value R3 to the NFC protocol processor 220.

The RF setting value specification module 222 may update the RF setting value with the setting value R3 transmitted by the RF update controller 211.

The RF recognition reader 221 may determine whether a connection for NFC has failed. If the RF recognition reader 221 recognizes that a connection for NFC has been successfully established (S570), the RF recognition reader 221 may transmit a signal indicating that a connection for NFC has been successfully established to the NFC service processor 210.

The location information verification module 212 may store the setting value R3 in the memory 150 by mapping the setting value R3 with the current location of the mobile terminal 100 (S580).

S550, S560, S570, and S580 have been described above as being performed only if a connection for NFC fails in S540. However, S550, S560, S570, and S580 may also be performed if the setting value corresponding to the current location of the mobile terminal 100 is not stored in the memory 150 or to improve the integrity of an NFC link such as to improve the error rate in NFC communications.

For example, if the setting value corresponding to the current location of the mobile terminal 100 is not stored in the memory 150, the RF update controller 211 may continue to sequentially update the RF setting value with each of the plurality of setting values stored in the memory 150 until a connection for NFC is successfully established. Then, if a connection for NFC is successfully established when a third setting value is set as the RF setting value, the RF update controller 211 may maintain the RF setting value and may store the third setting value in the memory 150 by mapping the third setting value with the current location of the mobile terminal 100. If a change of the current location of the mobile terminal 100 is recognized, the RF update controller 211 may set the default setting value, instead of the third setting value, as the RF setting value, or the location information verification module 212 may search for the setting value corresponding the changed current location of the mobile terminal from the memory 150.

The RF update controller 211 may prevent the RF setting value from being updated any longer once the RF setting value is updated with a first setting value corresponding to a predetermined index value. The predetermined index value may be an index value to which the last one of the plurality of setting values stored in the memory 150 is mapped.

Figure 7:
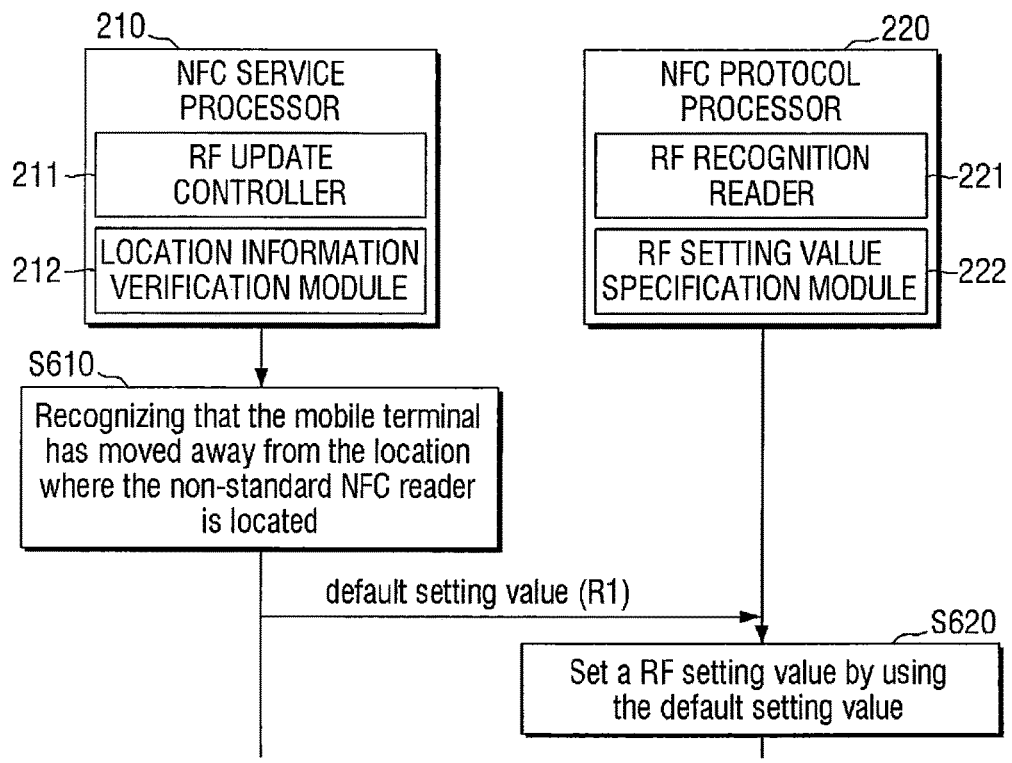
FIG. 7 is a flowchart illustrating a method of updating an RF setting value in an RF setting system according to example embodiments of the present disclosure.

FIG. 7 is a flowchart illustrating a method of updating an RF setting value in an RF setting system according to some embodiments of the present disclosure.

Referring to FIG. 7, the location information verification module 212, which is included in the NFC service processor 210, may determine whether the mobile terminal 100 is currently away from the location of a non-standard NFC reader (S610).

For example, the location information verification module 212 may recognize the current location of the mobile terminal 100 at intervals of a predetermined amount of time (for example, five seconds). The location information verification module 212 may recognize that the current location of the mobile terminal 100 no longer corresponds to location information mapped with each setting value stored in the memory 150. In this case, the location information verification module 212 may recognize that the mobile terminal 100 is currently away from the non-standard NFC reader.

If the location information verification module 212 recognizes in S610 that the mobile terminal 100 is currently away from the non-standard NFC reader, the RF update controller 211 may search for and/or find a default setting value R1 from the memory 150 and may transmit the default setting value R1 to the RF protocol processor 220. The RF setting value specification module 212 may set the default setting value R1 as an RF setting value (S620).

That is, when the mobile terminal 100 is currently away from the non-standard NFC reader, the RF setting value may be automatically updated with the default setting value R1.

Figure 8:
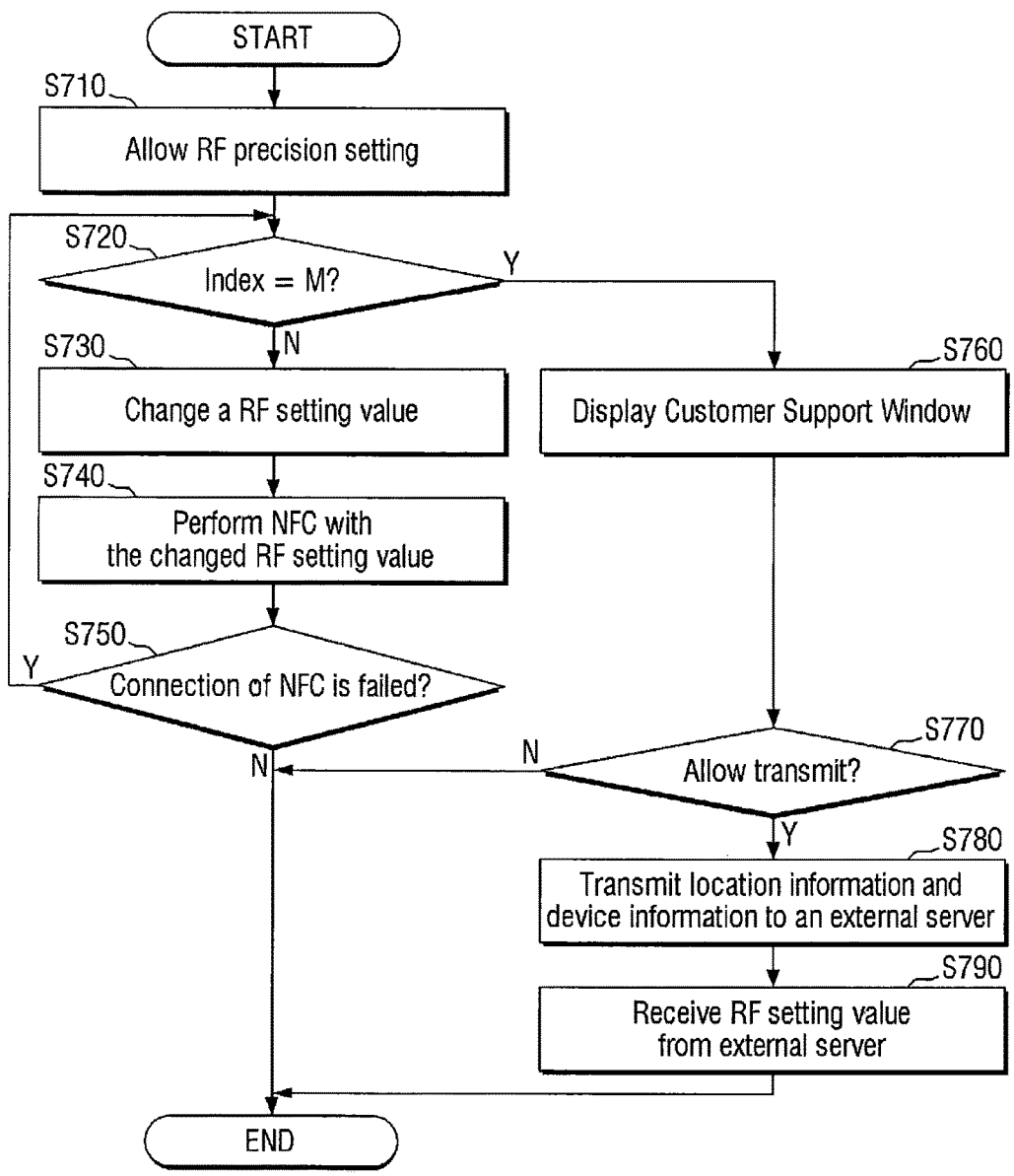
FIG. 8 is a flowchart illustrating a method of updating an RF setting value in an RF setting system according to example embodiments of the present disclosure.

FIG. 8 is a flowchart illustrating a method of updating an RF setting value in an RF setting system according to some embodiments of the present disclosure.

A location information recognition chip 130 of FIG. 1 may recognize first information, which is information regarding the current location of a mobile terminal 100 of FIG. 1. A communication chip 120 may establish a connection for communication to an external server.

A memory 150 may include a plurality of setting values. Each of the plurality of setting values may have an index value. Each of the plurality of setting values may have location information mapped thereto, but the present disclosure is not limited thereto. In some embodiments, there may exist setting values that do not have location information mapped thereto.

An RF recognition reader 221 may recognize an external NFC reader. Once the external NFC reader is recognized, an RF update controller 211 may acquire a default setting value from among the plurality of setting values. An RF setting value specification module may set the default setting value as an RF setting value.

If a determination is made that a connection for NFC has not been established to the external NFC reader within a predetermined amount of time or a threshold time that may be configured, the RF recognition reader 221 may recognize that a connection for NFC has failed.

Then, referring to FIG. 8, if the RF recognition reader 221 recognizes that a connection for NFC has failed, a display unit 110 may display whether to perform RF precision setting via a UI. If a user authorizes, via the UI, at RF precision setting is to be performed (S710), the RF setting value may be updated.

Specifically, the mobile terminal 100 may determine whether a current setting value currently set as the RF setting value corresponds to a predetermined index value (for example, M) (S720). The predetermined index value may be an index value to which the last one of the plurality of setting values stored in the memory 150 is mapped.

If the current setting value does not correspond to the predetermined index value (S720, N), the RF setting value may be updated via the RF update controller 211. Thereafter, the mobile terminal 100 may determine, via the RF recognition reader 221, whether a connection for NFC has been successfully established (S750).

If the mobile terminal 100 recognizes that a connection for NFC has failed (S750, Y), flow returns to S720 so that S720, S730, S740, and S750 may be performed again. In this case, the mobile terminal 100 may continue to sequentially update the RF setting value until the RF setting value is updated with a setting value having the predetermined index value.

If the current setting value corresponds to the predetermined index value, the display unit 110 may display a customer support window (S760). The customer support window may include a confirmation message asking whether to allow/authorize the transmission of first information, which is information regarding the current location of the mobile terminal 100, and/or information regarding the current setting value to an external server.

The mobile terminal 100 may receive a command as to whether to allow the transmission of the first information and/or second information, which is information regarding the external NFC reader (S770).

If a command to not allow the transmission of the first information and/or the second information is received via the customer support window (S770, N), the mobile terminal 100 may not establish a connection for NFC.

On the other hand, if a command to allow the transmission of the first information and/or the second information is received via the customer support window (S770, Y), the mobile terminal 100 may transmit the first information and/or the second information to the external server via the communication chip 120 (S780).

Thereafter, the mobile terminal 100 may receive a setting value corresponding to the first information and the second information from the external server via the communication chip 120 (S790). In this case, the memory 150 may store the received setting value by mapping it with the first information. Then, the RF update controller 211 may update the RF setting value with the received setting value if current location is the location corresponding the first information.

Although some embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A radio frequency (RF) system comprising:
   an RF recognition reader configured to recognize an external near field communication (NFC) reader;
   an RF update controller configured to acquire a default setting value from among a plurality of setting values stored in a memory in response to recognition of the external NFC reader by the RF recognition reader; and
   an RF setting value specification module configured to set the default setting value as an RF setting value,
   wherein when a connection for NFC is not established to the external NFC reader within a predetermined amount of time, the RF recognition reader is further configured to recognize that the connection for NFC fails, and
   wherein the RF update controller is further configured to sequentially update the RF setting value with ones of the plurality of setting values excluding the default setting value until the connection for NFC to the external NFC reader is successfully established.

2. The RF system of claim 1, wherein the RF setting value specification module is configured to set the RF setting value using an updated setting value that is updated by the RF update controller.

3. The RF system of claim 2, wherein when the RF setting value is updated with a first setting value having a predetermined index value while sequentially updating the RF setting value with ones of the plurality of setting values, the RF update controller is further configured to prevent the RF setting value from being further updated.

4. The RF system of claim 1, further comprising:
   a location information verification module configured to receive current location information and configured to search the plurality of setting values in the memory for a setting value corresponding to the current location information.

5. The RF system of claim 4,
   wherein when the setting value corresponding to the current location information is acquired from the memory, the RF update controller is further configured to transmit the setting value corresponding to the current location information to the RF setting value specification module, and wherein the RF setting value specification module is further configured to set the setting value corresponding to the current location information as the RF setting value.

6. The RF system of claim 4, wherein when the setting value corresponding to the current location information is not stored in the memory, the RF update controller is further configured to continue to sequentially update the RF setting value with each of the plurality of setting values until the connection for NFC is successfully established to the external NFC reader.

7. The RF system of claim 6, wherein when the RF setting value is updated with a first setting value having a predetermined index value while sequentially updating the RF setting value with ones of the plurality of setting values, the RF update controller is further configured to prevent the RF setting value from being further updated.

8. The RF system of claim 6, wherein when the connection for NFC is successfully established to the external NFC reader when a third setting value of the plurality of setting values is set as the RF setting value, the RF update controller is further configured to maintain the third setting value to be set as the RF setting value and to store the third setting value in the memory by mapping it with the current location information.

9. The RF system of claim 8, wherein when a change of the current location information is recognized by the location information verification module, the RF update controller is further configured to set the default setting value, instead of the third setting value, as the RF setting value.

10. An radio frequency (RF) system comprising:
an RF recognition reader configured to recognize an external NFC reader;
an RF update controller configured to acquire a default setting value from among a plurality of setting values stored in a memory, in response to recognition of the external NFC reader;
an RF setting value specification module configured to set the default setting value as an RF setting value; and
a location information verification module configured to receive current location information and configured to acquire a first setting value corresponding to the current location information from among the plurality of setting values in the memory,
wherein when the first setting value corresponding to the current location information is acquired by the location information verification module, the RF update controller is further configured to set the first setting value that was acquired, instead of the default setting value, as the RF setting value.

11. The RF system of claim 10,
wherein when a connection for NFC is not established to the external NFC reader within a predetermined amount of time, the RF recognition reader is further configured to recognize that the connection for NFC fails, and
wherein the RF update controller is further configured to sequentially update the RF setting value with ones of the plurality of setting values, except for the first setting value corresponding to the current location information, until the connection for NFC is successfully established to the external NFC reader.

12. The RF system of claim 11, wherein when the RF setting value is updated with a second setting value having a predetermined index value while sequentially updating the RF setting value with ones of the plurality of setting values, the RF update controller is further configured to prevent the RF setting value from being further updated.

13. The RF system of claim 11, wherein when the connection for NFC is successfully established to the external NFC reader when a third setting value of the plurality of setting values is set as the RF setting value, the RF update controller is further configured to maintain the third setting value to be set as the RF setting value.

14. The RF system of claim 13, wherein the RF update controller is further configured to store the third setting value in the memory by mapping the third setting value with the current location information.

15. The RF system of claim 10, wherein when a change of the current location information is recognized by the location information verification module, the RF update controller is further configured to set the default setting value, instead of the first setting value, as the RF setting value.

16. A mobile terminal comprising:
a communication chip configured to establish a connection for communication with an external server;
a location information recognition chip configured to recognize first information comprising information regarding a current location of the mobile terminal;
a memory configured to store a plurality of setting values;
an RF recognition reader configured to recognize an external NFC reader;
an RF update controller configured to acquire a default setting value from among the plurality of setting values in response to recognition of the external NFC reader; and
an RF setting value specification module configured to set the default setting value as an RF setting value,
wherein when a connection for NFC is not established to the external NFC reader within a predetermined amount of time, the RF recognition reader is further configured to recognize that the connection for NFC fails,
wherein the RF update controller is further configured to sequentially update the RF setting value with ones of the plurality of setting values until the connection for NFC is successfully established to the external NFC reader, and
wherein when the RF recognition reader recognizes that the connection for NFC has failed in a state where a first setting value having a predetermined index value is set as the RF setting value, the RF update controller is further configured to transmit the first information and a second information comprising information regarding the external NFC reader, to the external server.

17. The mobile terminal of claim 16, wherein the communication chip is further configured to receive a second setting value corresponding to the first information and the second information from the external server.

18. The mobile terminal of claim 17, wherein the memory is further configured to store the second setting value by mapping the second setting value of the plurality of setting values with the first information.

19. The mobile terminal of claim 17, wherein when the current location of the mobile terminal is recognized by the location information recognition chip as being a location corresponding to the first information, the RF update controller is further configured to update the RF setting value with the second setting value.

20. The mobile terminal of claim 16, wherein the first setting value having the predetermined index value comprises a first state, the mobile terminal further comprising:
   a display controller configured to control a first window to be displayed if the RF recognition reader recognizes that the connection for NFC has failed in a second state where the first setting value is set as the RF setting value,
   wherein in response to a command to allow transmission of the first information and the second information is received via the first window, the RF update controller is further configured to transmit the first information and the second information to the external server.

* * * * *